United States Patent
Muppalla (10) Patent No.: US 8,732,263 B2
(45) Date of Patent: *May 20, 2014

(54) SELF CLOCKING INTERRUPT GENERATION IN A NETWORK INTERFACE CARD

(71) Applicant: Juniper Networks, Inc., Sunnyvale, CA (US)

(72) Inventor: Dharmadeep Muppalla, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/964,355

(22) Filed: Aug. 12, 2013

(65) Prior Publication Data

US 2013/0332638 A1 Dec. 12, 2013

Related U.S. Application Data (63) Continuation of application No. 12/827,366, filed on Jun. 30, 2010, now Pat. No. 8,510,403.

(51) Int. Cl.
*G06F 15/167* (2006.01)

(52) U.S. Cl.
USPC ........... 709/212; 709/224; 709/246; 709/250; 710/48; 710/261; 710/263

(58) Field of Classification Search
CPC .................................. G06F 13/24; G06F 13/28
USPC .......... 709/212, 223–224, 246, 250; 710/260, 710/261, 263, 48
See application file for complete search history.

(56) References Cited

U.S. PATENT DOCUMENTS

| | | | |
|---|---|---|---|
| 6,434,651 B1 | 8/2002 | Gentry | |
| 6,453,360 B1 | 9/2002 | Muller et al. | |
| 6,467,008 B1 | 10/2002 | Gentry et al. | |
| 6,889,277 B2 | 5/2005 | Musumeci | |
| 6,981,084 B2 | 12/2005 | Connor | |
| 6,988,156 B2 | 1/2006 | Musumeci | |
| 7,426,589 B2 * | 9/2008 | Oh | 710/47 |
| 7,444,451 B2 | 10/2008 | Wang et al. | |
| 7,801,046 B2 * | 9/2010 | Persson et al. | 370/235 |
| 7,813,352 B2 | 10/2010 | Riddle et al. | |
| 8,103,809 B1 | 1/2012 | Michels et al. | |
| 8,510,403 B2 * | 8/2013 | Muppalla | 709/212 |
| 2002/0087716 A1 | 7/2002 | Mustafa | |
| 2002/0188749 A1 | 12/2002 | Gaur | |
| 2003/0200368 A1 | 10/2003 | Musumeci | |
| 2003/0200369 A1 | 10/2003 | Musumeci | |
| 2004/0042505 A1 * | 3/2004 | Oh | 370/519 |
| 2004/0221080 A1 | 11/2004 | Connor | |
| 2006/0282579 A1 | 12/2006 | Dederer | |
| 2008/0140468 A1 | 6/2008 | Ramsey et al. | |
| 2009/0268611 A1 | 10/2009 | Persson et al. | |
| 2010/0070669 A1 * | 3/2010 | Johnson et al. | 710/264 |
| 2011/0153876 A1 * | 6/2011 | Caffee et al. | 710/22 |

* cited by examiner

*Primary Examiner* — Oanh Duong
(74) *Attorney, Agent, or Firm* — Harrity & Harrity, LLP (57) ABSTRACT

A network interface card may issue interrupts to a host in which the determination of when to issue an interrupt to the host may be based on the incoming packet rate. In one implementation, an interrupt controller of the network interface card may issue interrupts to that informs a host of the arrival of packets. The interrupt controller may issue the interrupts in response to arrival of a predetermined number of packets, where the interrupt controller re-calculates the predetermined number based on an arrival rate of the incoming packets.

20 Claims, 6 Drawing Sheets

SELF CLOCKING INTERRUPT GENERATION IN A NETWORK INTERFACE CARD

RELATED APPLICATION

This application is a continuation of U.S. patent application Ser. No. 12/827,366, filed Jun. 30, 2010, now U.S. Pat. No. 8,510,403, which is incorporated herein by reference.

BACKGROUND

Computing devices frequently receive and transmit data over a network. Personal computing devices, such as personal computers and laptops, may act as endpoints for data in the network. Other devices, such as routers, firewalls, and other network devices, may send and receive data to enable the network.

Data units, such as packets, may be transmitted between computing devices in the network. Generally, a network interface card (NIC) may include a hardware device that handles an interface to the network. The NIC allows the computing device to access the network. NICs may process data at the physical layer and the data link layer. An Ethernet NIC, for instance, may include logic that allows the NIC to communicate with a physical layer and data link layer standard for Ethernet. Although a NIC is called a "card", a NIC can include logic that is, for example, embedded within a main computing board of a computing device, and thus does not necessarily need to be implemented on a separate physical card.

NICs may use a number of different techniques to transfer data to a host device. One such technique includes polling-based data transfer, in which the host device (e.g., a software device), at time intervals determined by the host device, examines the status of the NIC to determine if data units are available at the NIC. Another possible technique includes an interrupt-driven technique, in which the NIC alerts the host device when a data unit is ready to be transmitted to the host device. Polling-based data transfer techniques can be particularly effective for high bandwidth applications, as the host device may only poll the NIC when it is ready to process data. Interrupt driven techniques, however, can provide lower latency and/or lower host overhead for the delivery of data.

In some existing NIC/host device interfaces, the host may, through operation of a software driver, switch between polling and interrupt modes. The NIC may be initially placed in interrupt mode but may be placed in polling mode, by the host device, when the host device detects a high interrupt arrival rate. Such a system can require relatively high software overhead at the host device.

SUMMARY

One implementation is directed a device that may include one or more ports to connect to physical transport media for a network and a memory to store packets received from the network at the ports. The device may further include an interrupt controller to issue an interrupt that informs a host of the arrival of the packets, the interrupt controller issuing the interrupt in response to arrival of a predetermined number of packets at the device. The interrupt controller may re-calculate the predetermined number based on an arrival rate of the incoming packets.

Another possible implementation is directed to a method that may include receiving packets from a communication medium; determining a quantity of the received packets during a time period; and updating a value at the end of the time period, the value defining a number of packets that are to be received before issuing an interrupt to a host to inform the host of the arrival of the packets. The method may further include issuing the interrupt to the host in response to reception of the number of packets defined by the value, and providing the packets to the host.

Yet another possible implementation is directed to a host computing system that is connected to a network; and a network interface card, connected to the host computing system, to provide a physical layer and a data link layer connection to the network. The network interface card may include a memory to store packets received from the network; and an interrupt controller to issue an interrupt that informs the host computing system of the arrival of the packets. The interrupt controller may issue the interrupt in response to arrival of a predetermined number of packets at the network interface card, where the interrupt controller re-calculates the predetermined number based on an arrival rate of the incoming packets.

BRIEF DESCRIPTION OF THE DRAWINGS

The accompanying drawings, which are incorporated in and constitute a part of this specification, illustrate one or more embodiments described herein and, together with the description, explain the invention. In the drawings.

DETAILED DESCRIPTION

The following detailed description refers to the accompanying drawings. The same reference numbers in different drawings may identify the same or similar elements. Also, the following detailed description does not limit the invention.

A technique for self clocking of interrupts issued by a NIC, to notify a host of incoming packets, is described herein. The NIC may change the rate at which interrupts are issued based on an incoming packet rate. The host device may set parameters in the NIC that control how the NIC changes the rate at which interrupts are issued. At high incoming packet rates, the technique described herein may act similar to a polling-based reading of packets. At lower incoming packet rates, the technique may act similar to an interrupt-based reading of packets.

System Overview

Figure 1:
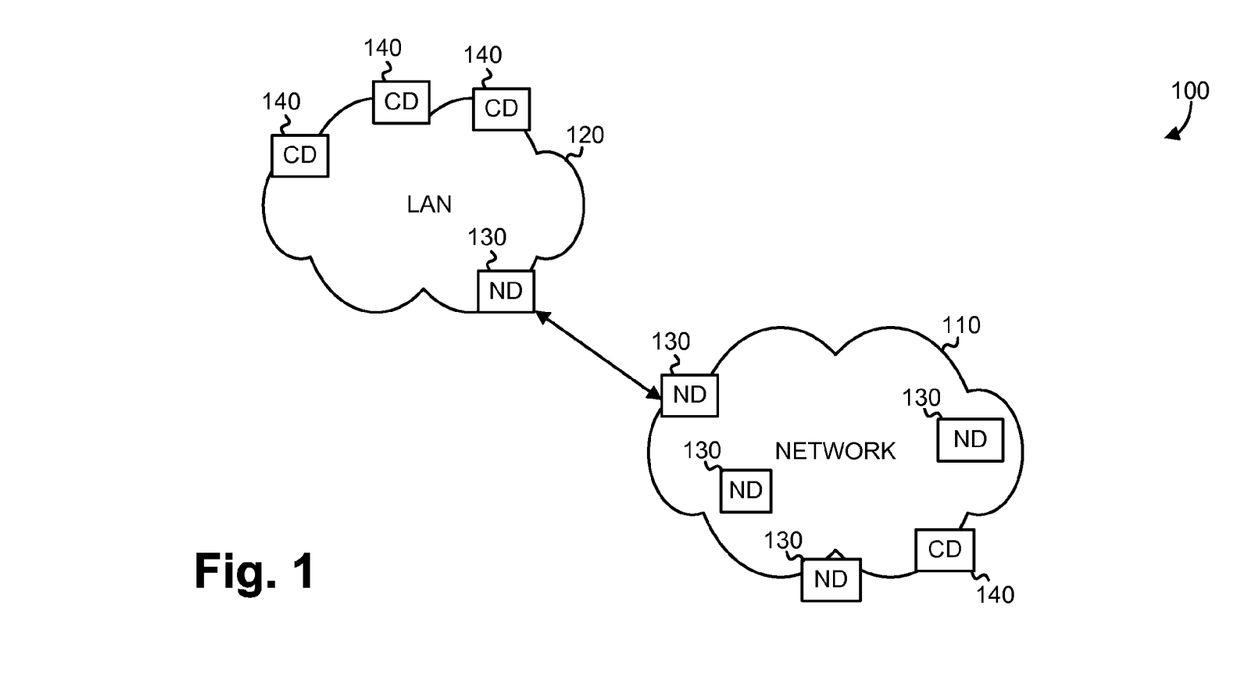
FIG. 1 is a diagram of an example of a system in which concepts described herein may be implemented.

FIG. 1 is a diagram of an example of a system 100 in which concepts described herein may be implemented. System 100 may include a number of physical or logical networks. As particularly shown, system 100 may include a network 110 connected to one or more additional networks, such as a local area network (LAN) 120. LAN 120 may include one or more devices that are logically organized into a LAN. In one example implementation, network 110 and LAN 120 may include network devices (NDs) 130, such as switches, gateways, routers, or other devices used to implement network 110/LAN 120. Network 110 and LAN 120 may also include end-user computing devices (CDs) 140.

Network 110 may generally include one or more types of networks. For instance, network 110 may include a wide area network (WAN), such as a cellular network, a satellite network, the Internet, or a combination of these networks that that are used to transport data. Network 110 may particularly be an Internet protocol (IP)-based packet network that includes a number of network devices 130, such as routers, that transmit packets through network 110.

LAN 120 may include a number of computing devices, such as, for example, network devices 130 and end-user computing devices 140. LAN 120 may implement, for example, a proprietary network, such as a corporate network, that may be connected to network 110 through a gateway.

Computing devices 140 may include, for example, general-purpose computing devices such as personal computers, laptops (or other portable computing devices), servers, or smartphones. Computing devices 140 may generally be used by end-users or may be used to provide services to other computing devices in system 100.

FIG. 1 shows an example of components that may be included in system 100. In other implementations, system 100 may include fewer, different, differently arranged, or additional components than depicted in FIG. 1. Alternatively, or additionally, one or more components of system 100 may perform one or more tasks described as being performed by one or more other components of system 100.

Figure 2:
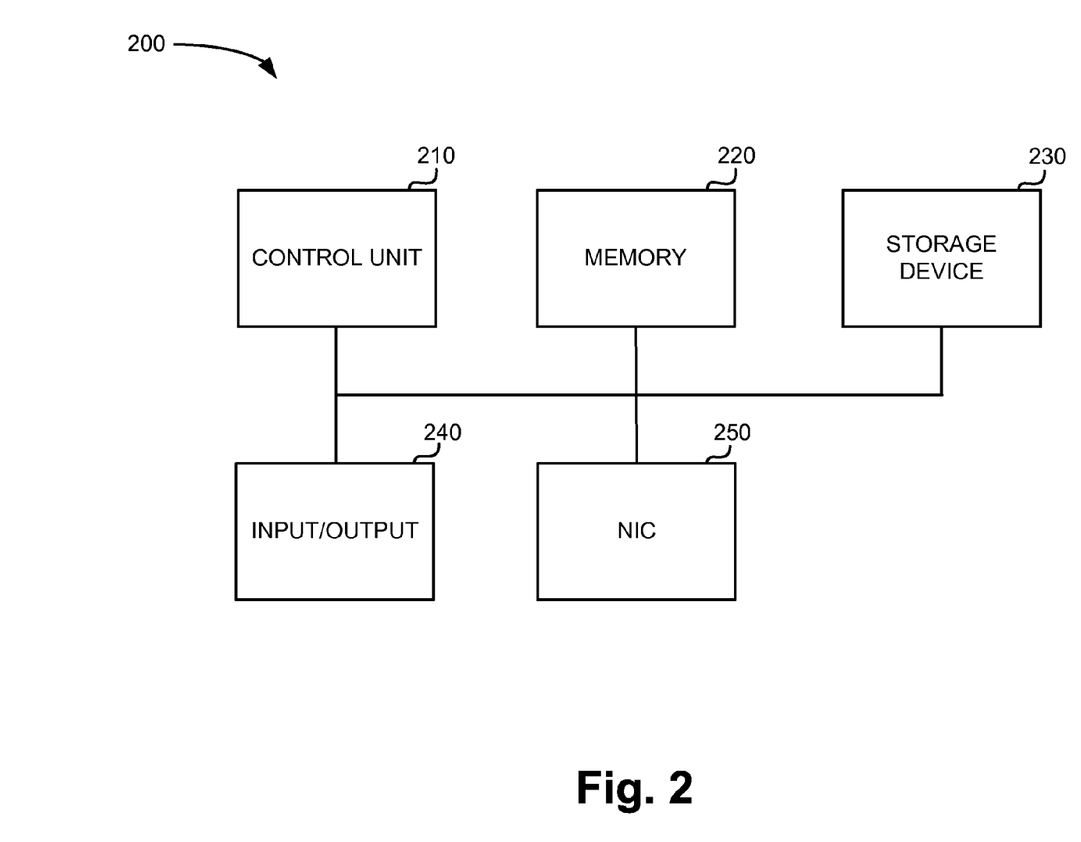
FIG. 2 is a diagram illustrating an example of an implementation of a device illustrated in FIG. 1.

FIG. 2 is a diagram illustrating an example of an implementation of a device 200, such as one of network devices 130 or end-user computing devices 140. As shown, device 200 may include a control unit 210, a memory 220, a storage device 230, input/output devices 240, and a NIC 250.

Control unit 210 may include a processor, microprocessor, or another type of processing logic that interprets and executes instructions. Among other functions, control unit 210 may implement a driver program that is used to communicate with NIC 250.

Memory 220 may include a dynamic or static storage device that may store information and instructions for execution by control unit 210. For example, memory 220 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory. Storage device 230 may include a magnetic and/or optical recording medium and its corresponding drive.

Input/output devices 240 may include mechanisms that permit an operator to input information to or receive information from device 200. Input/output devices 240 may include, for example, a keyboard, a mouse, a pen, a microphone, voice recognition and/or biometric mechanisms, etc.

NIC 250 may include one or more network interface cards that implement an interface, such as an interface for the physical and data link layer, for communicating with other devices in system 100. Through NIC 250, device 200 may send and receive data units, such as packets, over networks 110 and 120. In some implementations, NIC 250 may be implemented as a separate card that can be inserted and removed from device 200. In other implementations, NIC 250 may be implemented in circuitry that is integrated within or on the same printed circuit board as other elements of device 200.

As will be described in detail below, device 200 may perform certain operations relating to NIC 250 and to the interface between control unit 210/memory 220 and NIC 250. Device 200 may perform these operations in response to control unit 210 executing software instructions contained in a computer-readable medium, such as memory 220. A computer-readable medium may be defined as a physical or logical memory device. A logical memory device may refer to memory space within a single, physical memory device or spread across multiple, physical memory devices.

The software instructions may be read into memory 220 from another computer-readable medium or from another device. The software instructions contained in memory 220 may cause control unit 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 illustrates example components of device 200, in other implementations, device 200 may include fewer, additional, different and/or differently arranged components than those depicted in FIG. 2. Alternatively, or additionally, one or more components of device 200 may perform one or more other tasks described as being performed by one or more other components of device 200.

Network Interface Card

Figure 3:
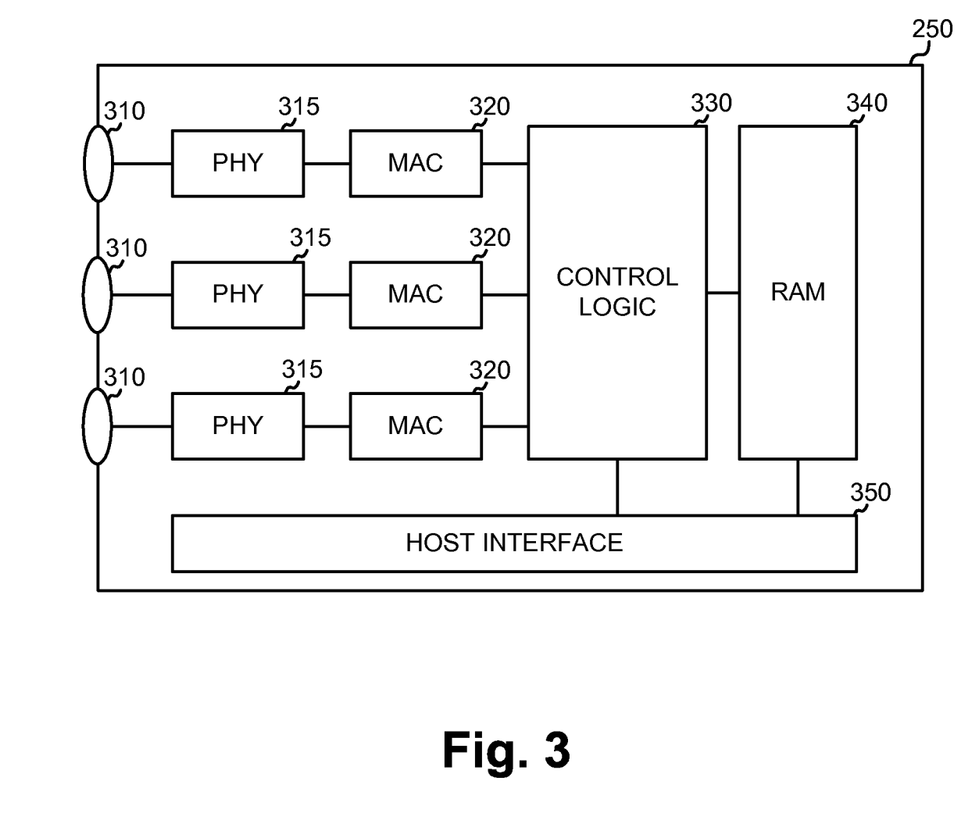
FIG. 3 is a diagram illustrating an example of an implementation of a network interface card depicted in FIG. 2.

FIG. 3 is a diagram illustrating an example of an implementation of NIC 250. NIC 250 may include one or more (three are particularly illustrated) Ethernet ports 310. Each port 310 may be designed to connect to a physical transport medium for the network. Each port 310 may also be associated with physical-layer transceiver (PHY) logic 315 and media access controller (MAC) logic 320. NIC 250 may additionally include control logic 330, memory (RAM) 340, and host interface logic 350.

Ethernet ports 310 may each include a mechanical slot designed to receive a network cable, such as standard category 5, 5e, or 6 twisted-pair cables. PHY logic 315 may generally operate to encode and decode data that is transmitted and received over ports 310. MAC logic 320 may act as an interface between the physical layer, as output from PHY logic 315, and control logic 330. MAC logic 320 may provide addressing and channel access control mechanisms that make it possible for several terminals or network nodes to communicate.

Control logic 330 may include logic that controls the writing/reading of incoming data to RAM 340 and logic relating to the implementation of host interface logic 350 for communicating with a host (i.e., control unit 210 and/or memory 220 of device 200). As described in more detail below, control logic 330 may, for example, issue interrupts to the host to signal the arrival of packets from Ethernet ports 310. The rate at which interrupts are issued (i.e., the number of packets per interrupt) to signal the host may be based on parameters set by the host, based on incoming packet bandwidth, and based on a previous packets per interrupt value.

Control logic 330 may be implemented using, for example, a general-purpose microprocessor or based on other types of control logic, such as an application specific integrated circuit (ASIC) or field programmable gate array (FPGA).

RAM 340 may include memory, such as high speed random access memory, that may be used to buffer incoming and/or outgoing packets. In one implementation, incoming packets may be stored in RAM 340 and the host may read the packets from RAM 340 using a direct memory access (DMA) technique in which the host directly reads the packets from RAM 340.

Host interface logic 350 may include an interface through which the host communicates with NIC 250. For example, host interface logic 350 may implement a peripheral component interconnect (PCI) bus, PCI express (PCI-E), or other bus architecture for communicating with the host.

Although FIG. 3 illustrates example components of NIC 250, in other implementations, NIC 250 may include fewer, additional, different and/or differently arranged components than those depicted in FIG. 3. Alternatively, or additionally, one or more components of NIC 250 may perform one or more other tasks described as being performed by one or more other components of NIC 250.

Self Clocking Interrupt Operation

Figure 4:
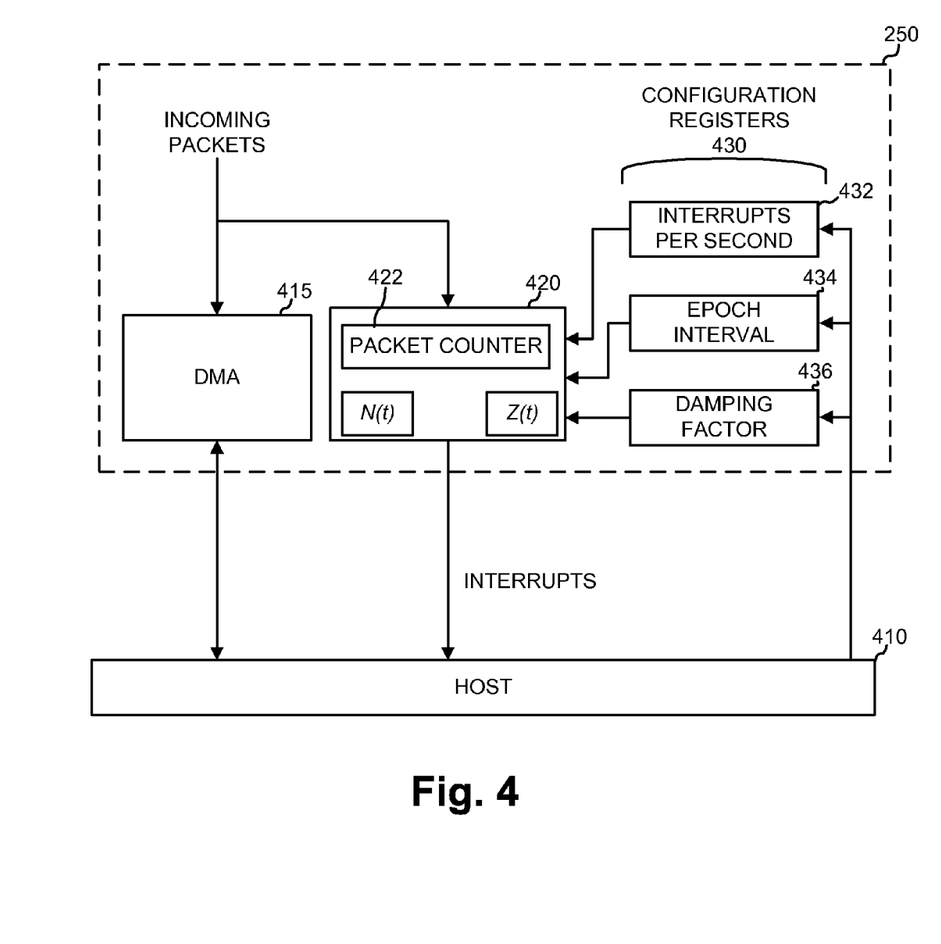
FIG. 4 is a block diagram conceptually illustrating components of a network interface card that may be used in issuing interrupts to a host.

FIG. 4 is a block diagram conceptually illustrating components of NIC 250 that may be used in issuing interrupts to the host. In FIG. 4, the host portion of device 200 is labeled as host 410. Host 410 may correspond to the portions of device 200 other than NIC 250. In one implementation, host 410 may be a software driver that is implemented by control unit 210 and/or memory 220. The driver may be designed to communicate with NIC 250.

As shown in FIG. 4, NIC 250 may include a direct memory access (DMA) component 415, an interrupt controller component 420, and configuration registers 430. DMA component 415 may include memory, such as static random access memory (SRAM), into which incoming packets are stored. DMA component 415 may be implemented by, for example, RAM 340. Host 410 may directly read packets from DMA component 415. The packets may be read from DMA component 415 in response to an interrupt sent from interrupt controller component 420 to host 410.

Interrupt controller component 420 may send interrupts to host 410 at points in time determined by interrupt controller component 420. In one implementation, and as will be described in more detail below, interrupt controller component 420 may send an interrupt to host 410 after a certain number of packets are received. The number of packets to receive before sending the interrupt may vary based on the incoming packet rate and based on parameters set by host 410 in configuration registers 430.

Interrupt controller 420 may include a packet counter 422 that counts the number of received packets. Interrupt controller 420 may issue interrupts after a certain number of packets are received. Packet counter 422 may be used to determine when an allotted number of packets have been received.

Interrupt controller 420 may calculate or keep track of a number of values used to determine when to send an interrupt to host 410. Two of the values are illustrated in FIG. 4: $N(t)$, the number of interrupts delivered in a particular interval, called an epoch, $t$; and $Z(t)$, the number of packets per interrupt for epoch $t$.

Configuration registers 430 may include one or more registers through which host 410 can set parameters controlling the rate at which interrupts are sent to host 410 by interrupt controller 420. Configuration registers 430 may be implemented as memory registers that are writable by host 410. In alternative implementations, host 410 may set the parameters defined by configuration registers 430 using other techniques, such as by communicating with logic in NIC 250 using a higher level communication protocol.

In one implementation, a separate set of configuration registers 430 may be maintained for every class of service supported by NIC 250. NIC 250 may support different classes of service, in which packets belonging to a higher class of service may be given higher priority by NIC 250 and/or host 410. NIC 250 may process each class of service using a separate queue to store incoming packets. When a separate set of configuration registers 430 is maintained for different classes of service, host 410 may configure configuration registers on a per-class-of-service basis. In this case, NIC 250 may deliver interrupts to host 410 on a per-class-of-service basis, in which NIC 250 may send an interrupt to host 410 whenever any of the queues corresponding to the classes is determined to meet the conditions for receiving an interrupt.

Configuration registers 430 may include a first register 432 to store a value indicating a target number of interrupts per second. Host 410 may set the target number of interrupts per second based on the capacity of host 410 to handle interrupts from NIC 250. In some situations, host 410 may adjust the target number of interrupts per second based on load at host 410 or based on other factors. Configuration registers 430 may further include a second register 434 to store a value indicating an epoch interval that is to be used by NIC 250. The epoch interval may be the interval at which NIC 250 processes incoming packets to generate interrupts before NIC 250 recalculates $Z(t)$ (i.e., the number of packets to receive before generating an interrupt in interval $t$). In other words, after each epoch, NIC 250 may recalculate the number of packets to receive before generating an interrupt. Host 410 may, for example, set the epoch interval to an interval in which the standard deviation of the traffic pattern is negligible (e.g., 10 milliseconds). Configuration registers 430 may further include a third register 436 to store a damping factor. The damping factor, $\alpha$, may describe how quickly NIC 250 changes the current value of $Z(t)$ in response to a change in the incoming packet rate. The damping factor will be described in more detail below.

$Z(t)$, as previously mentioned, may define the number of packets to receive before NIC 250 issues an interrupt. Interrupt controller 420 may re-calculate the value of $Z(t)$ for each epoch $t$. $Z(t)$ may generally be adjusted based on the incoming packet rate pattern. For instance, when the incoming packet rate increases during epoch $t$, $Z(t+1)$ (packets per interrupt in the next epoch) may be adjusted higher. For relatively high incoming packet rates, interrupts issued by interrupt controller 420 may cause host 410 to read a number of packets from DMA component 415 at semi-periodic intervals. In this situation, host 410 may effectively operate as if it were polling NIC 250. When the incoming packet rate decreases, however, $Z(t+1)$ may be adjusted lower. In the limiting situation, $Z(t)$ may be set to one, which may effectively operate as a per-packet interrupt scheme. From the perspective of host 410, the interrupt generation technique of NIC 250 can allow host 410 to effectively handle increases or decreases in incoming packet rates without increasing the processing demands placed on host 410.

One possible technique for adjusting $Z(t)$, at each epoch $t$, based on the incoming packet rate will now be described.

Let $N(t)$ be the number of interrupts delivered in epoch $t$. $Z(t)$, as previously mentioned, may refer to the calculated value, for epoch $t$, that represents the number of packets that are to be received before issuing an interrupt. Further, let $x$ represent the value for the target number of interrupts per second (i.e., the value from first register 432) and $T$ represent the epoch interval (i.e., the value from second register 434).

The total number of interrupts that can be handled by host 410 per epoch may thus be calculated as xT (i.e., the hosts interrupt bandwidth per epoch). The value for Z(t) in the next epoch, Z(t+1), may be calculated using an exponential smoothing function of the form:

$$\operatorname{ceil}\left[\alpha \cdot \left(\operatorname{ceil}\left(\frac{Z(t) \cdot N(t)}{xT}\right)\right) + (1 - \alpha) \cdot Z(t)\right] \quad (1)$$

In equation (1), $\alpha$ is the damping factor (i.e., the value from third register 436) and ceil is the ceiling function. The damping factor, $\alpha$, may be set between zero and 1.0. Higher values of $\alpha$ more heavily weight the packet load in the previous epoch when calculating Z(t+1) and lower values of $\alpha$ more heavily weight the previous output of equation (1) (i.e., Z(t)) when calculating Z(t+1).

Figure 5:
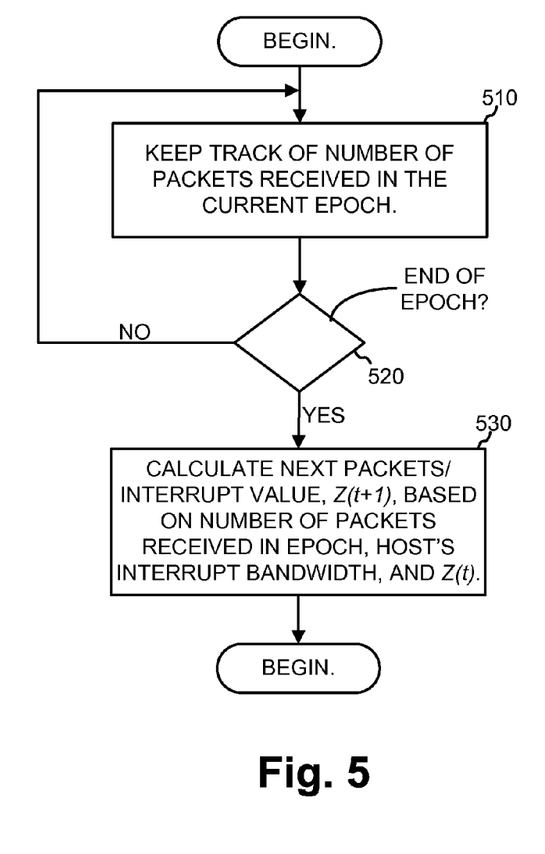
FIG. 5 is a flow chart illustrating an example of a process for updating a packets per interrupt value.

FIG. 5 is a flow chart illustrating an example of a process 500 for updating Z(t) at each epoch. In one implementation, process 500 may be performed by interrupt controller 420 of NIC 250.

Interrupt controller 420 may keep track of the number of packets received in the current epoch (block 510). In one implementation, the number of packets received in the current epoch may be estimated by multiplying the number of interrupts sent in the epoch by Z(t). In an alternative implementation, interrupt controller 420 may directly keep track of the total number packets received, such as through the use of a counter to count the number of incoming packets.

Process 500 may further include determining whether the epoch has ended (block 520). Z(t) may be updated after each epoch.

When the epoch has ended (block 520—YES), Z(t) may be updated (i.e., Z(t+1) calculated) based on Z(t), the total number of packets received in the previous epoch, and based on the host's interrupt bandwidth. Z(t) may be updated using equation (1), in which Z(t)*N(t) represents the total number of packets received in the previous epoch and xT represents the host's interrupt bandwidth. The updated value for Z(t), Z(t+1), may then be used to issue interrupts in the next interval.

Figure 6:
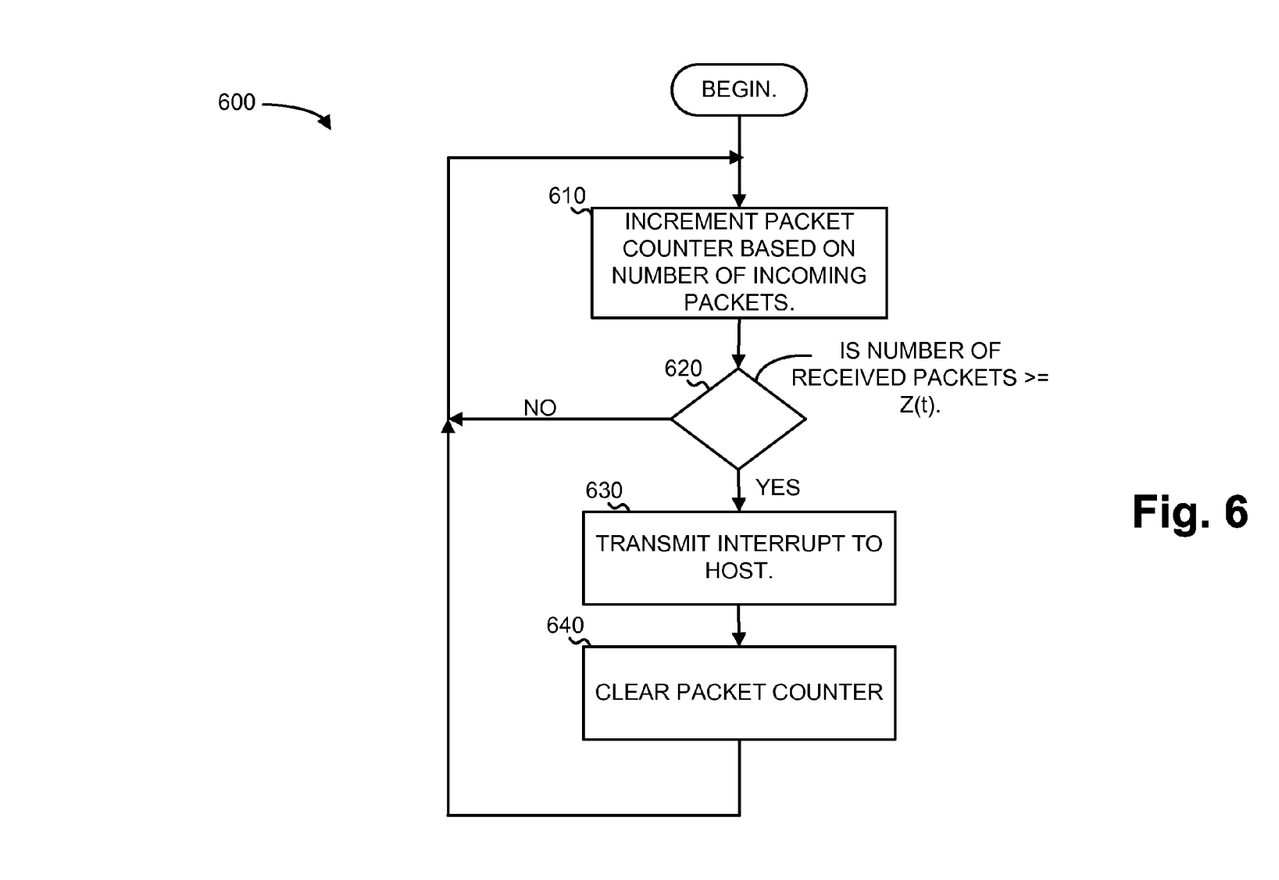
FIG. 6 is a flow chart illustrating an example of a process for issuing interrupts.

FIG. 6 is a flow chart illustrating an example of a process 600 for issuing interrupts. Process 600 may be implemented by, for example, interrupt controller 420.

Process 600 may include incrementing packet counter 422 based on the number of incoming packets (block 610). Packet counter 422 may generally keep track of the number of incoming packets. Packet counter 422 may be incremented each time a packet arrives or is stored in RAM 340. Other methods of keeping track of the incoming packet rate may alternatively be used.

Process 600 may further include determining whether the number of received packets is equal to or greater than Z(t) the number of packets per interrupt (block 620). When the number of received packets is equal to or greater than Z(t) (block 620—YES), interrupt controller 420 may transmit an interrupt to host 410 (block 630). The interrupt may cause host 410 to read the packets from DMA component 415. In one possible implementation, host 410 may first read a value from NIC 250, such as a value in a specific register or memory location of DMA component 415, which indicates the location and/or number of packets that are to be read from DMA component 415. Host 410 may then read the indicated number of packets from DMA component 415.

Process 600 may further include clearing packet counter 422 (block 640). Clearing packet counter 422 may reset the count to start the count for the next interrupt.

An example of how Z(t) may be dynamically re-calculated over a number of epochs will now be described with reference to Table I, below. Table I lists example values for Z(t) (column two) over 8 successive epochs t (column one). The third column lists example values for the number of packets received during each epoch t. In the example shown in table I, assume that $\alpha$ is 0.6 and xT is equal to 5 (i.e., the host's desired interrupt bandwidth is equal to 5 interrupts per epoch).

As shown in Table I, assume that the initial value of Z(t) is 200 packets per interrupt, which corresponds to a total estimated packet bandwidth of 1000 packets per epoch. In epoch zero, however, assume 2000 packets are actually received. In epoch one, Z(t) is updated to 320 packets per interrupt. In epoch one, 2500 packets are received, and Z(t) adjusts to, in epoch two, 428 packets per interrupt. As shown, in epochs two through six, the number of received packets decreases and holds at zero packets for a number of epochs, causing Z(t) to adjust down. If zero packets are continued to be received per epoch, Z(t) would eventually reach a minimum value of one.

TABLE I

| T | Z(t) | Z(t) * N(t) |
|---|------|-------------|
| 0 | 200  | 2000        |
| 1 | 320  | 2500        |
| 2 | 428  | 500         |
| 3 | 232  | 400         |
| 4 | 141  | 0           |
| 5 | 57   | 0           |
| 6 | 23   | 0           |
| 7 | 10   |             |

CONCLUSION

A self clocking technique for generating interrupts is described in which interrupts are issued to inform a host of arriving packets after a certain number of packets have arrived. The number of packets per interrupt may vary based on the incoming packet rate to thus create a self clocking mechanism for issuing the interrupts. In one implementation, the technique may be implemented in a network interface card, thus removing from the host the burden of monitoring and adjusting between polling and interrupt driven packet reception.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

While series of blocks have been described in FIGS. 5 and 6 the order of the blocks may vary in other implementations. Also, non-dependent blocks may be performed in parallel. Even though particular combinations of features are recited in the claims and/or disclosed in the specification, these combinations are not intended to limit the invention. In fact, many of these features may be combined in ways not specifically recited in the claims and/or disclosed in the specification.

Further, certain aspects described herein may be implemented as "logic" or as a "component" that performs one or more functions. This logic or component may include hardware, such as an application specific integrated circuit or a field programmable gate array, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed:

1. A method comprising:
determining, by a device, a number associated with a first quantity of packets to receive during a first period of time,
the number being used to generate an interrupt and being determined based on:
applying a smoothing function to a value associated with a number of packets received during another period of time, occurring prior to the first period of time, to produce a result,
the value being based on the number of packets received during the other period of time, a number of interrupts generated during the other period of time, a damping factor, and an interrupt bandwidth associated with a host device,
and
using the produced result to determine the number;
receiving, by the device, the first quantity of packets during the first period of time;
updating, by the device and based on the received first quantity of packets, the number to a second number,
the second number being different than the number;
receiving, by the device, a second quantity of packets during a second period of time,
the second period of time being subsequent to the first period of time;
updating, by the device, the second number based on a relationship between the received second quantity of packets and the second number; and
issuing, by the device, the interrupt based on the updated second number.

2. The method of claim 1, further comprising:
identifying one or more parameters associated with a rate of issuing the interrupt,
where, when issuing the interrupt, the method includes:
issuing the interrupt based on the one or more parameters.

3. The method of claim 1, further comprising:
determining that the second period of time has ended,
where, when updating the second number, the method includes:
updating the second number at the end of the second period of time.

4. The method of claim 1, where, when updating the second number, the method includes:
updating the second number further based on the interrupt bandwidth.

5. The method of claim 1, further comprising:
incrementing, based on the received first quantity of packets, a counter; and
incrementing, based on the received second quantity of packets, the counter.

6. The method of claim 5, further comprising:
clearing, after issuing the interrupt, the counter; and
receiving, after clearing the counter, a third quantity of packets during a third period of time,
the third period of time being subsequent to the second period of time.

7. The method of claim 6, further comprising:
updating the second number, based on a relationship between the received third quantity of packets and the second number, to a third number; and
issuing another interrupt based on the third number.

8. A device comprising:
a memory to store instructions; and
a processor to execute the stored instructions to:
determine a number associated with a first quantity of packets to receive during a first period of time,
the number being used to generate an interrupt, and
the processor, when determining the number, being to:
apply a smoothing function to a value associated with a number of packets received during another period of time, occurring prior to the first period of time, to produce a result,
the value being based on the number of packets received during the other period of time, a number of interrupts generated during the other period of time, a damping factor, and an interrupt bandwidth associated with a host device,
and
use the produced result to determine the number;
receive the first quantity of packets during the first period of time;
update, based on the received first quantity of packets, the number to a second number,
the second number being different than the number;
receive a second quantity of packets during a second period of time,
the second period of time being subsequent to the first period of time;
update the second number based on a relationship between the received second quantity of packets and the second number; and
issue the interrupt based on the updated second number.

9. The device of claim 8, where the processor is further to:
identify one or more parameters associated with a rate of issuing the interrupt,
where, when issuing the interrupt, the processor is further to:
issue the interrupt based on the one or more parameters.

10. The device of claim 8, where the processor is further to:
determine that the second period of time has ended,
where, when updating the second number, the processor is further to:
update the second number at the end of the second period of time.

11. The device of claim 8, where, when updating the second number, the processor is further to:
update the second number further based on the interrupt bandwidth.

12. The device of claim 8, where the processor is further to:
increment, based on the received first quantity of packets, a counter; and increment, based on the received second quantity of packets, the counter.

13. The device of claim 12, where the processor is further to:
   clear, after issuing the interrupt, the counter; and
   receive, after clearing the counter, a third quantity of packets during a third period of time,
      the third period of time being subsequent to the second period of time.

14. The device of claim 13, where the processor is further to:
   update the second number, based on a relationship between the received third quantity of packets and the second number, to a third number; and
   issue another interrupt based on the third number.

15. A non-transitory computer-readable medium storing instructions, the instructions comprising:
   one or more instructions which, when executed by at least one processor, cause the at least one processor to:
      determine a number associated with a first quantity of packets to receive during a first period of time,
         the number being used to generate an interrupt, and
         the one or more instructions to determine the number including:
            one or more instructions to apply a smoothing function to a value associated with a number of packets received during another period of time, occurring prior to the first period of time, to produce a result,
               the value being based on the number of packets received during the other period of time, a number of interrupts generated during the other period of time, a damping factor, and an interrupt bandwidth associated with a host device, and
            one or more instructions to use the produced result to determine the number;
      receive the first quantity of packets during the first period of time;
      update, based on the received first quantity of packets, the number to a second number,
         the second number being different than the number;
      receive a second quantity of packets during a second period of time,
         the second period of time being subsequent to the first period of time;
      update the second number based on a relationship between the received second quantity of packets and the second number; and
      issue the interrupt based on the updated second number.

16. The non-transitory computer-readable medium of claim 15, where the instructions further comprise:
   one or more instructions to identify one or more parameters associated with a rate of issuing the interrupt,
   where the one or more instructions to issue the interrupt include:
      one or more instructions to issue the interrupt based on the one or more parameters.

17. The non-transitory computer-readable medium of claim 15, where the instructions further comprise:
   one or more instructions to determine that the second period of time has ended,
   where the one or more instructions to update the second number include:
      one or more instructions to update the second number at the end of the second period of time.

18. The non-transitory computer-readable medium of claim 15, where the one or more instructions to update the second number include:
   one or more instructions to update the second number further based on the interrupt bandwidth.

19. The non-transitory computer-readable medium of claim 15, where the instructions further comprise:
   one or more instructions to increment, based on the received first quantity of packets, a counter;
   one or more instructions to increment, based on the received second quantity of packets, the counter;
   one or more instructions to clear, after issuing the interrupt, the counter; and
   one or more instructions to receive, after clearing the counter, a third quantity of packets during a third period of time,
      the third period of time being subsequent to the second period of time.

20. The non-transitory computer-readable medium of claim 19, where the instructions further comprise:
   one or more instructions to update the second number, based on a relationship between the received third quantity of packets and the second number, to a third number; and
   one or more instructions to issue another interrupt based on the third number.

* * * * *